July 11, 1939.　　　J. S. REID　　　2,165,762

GATE FOR THERMOPLASTIC MOLDS

Filed Jan. 7, 1937

INVENTOR
JAMES S. REID
BY
ATTORNEY

Patented July 11, 1939

2,165,762

UNITED STATES PATENT OFFICE 2,165,762

GATE FOR THERMOPLASTIC MOLDS

James S. Reid, Shaker Heights, Ohio, assignor to Thermo-Plastics, Inc., St. Clair, Mich., a corporation of Michigan Application January 7, 1937, Serial No. 119,496

5 Claims. (Cl. 18—42)

This invention relates to an improvement in molds and particularly to a new and improved gate for molds used in connection with molding of thermoplastic material around an insert, as more fully described in United States Patent No. 2,043,584, issued June 9, 1936, to Harry A. Husted.

It has been found advantageous in connection with such molding operations to place the insert in the mold with very slight clearance with respect to the walls of the mold cavity and to provide gates along and substantially parallel to the plane of the parting line of the mold. In such instances, the practice has been to provide a gate which is comparatively thin in the direction normal to the parting plane and relatively wide in the direction of or parallel to the parting plane. When the material enters the mold cavity from a gate of this character and flows into the limited clearance space between the insert and the mold cavity wall, there is a tendency for the material to flow only part way around the insert or to flow largely to one side thereof with the resultant unbalance of pressure which moves or warps the insert out of the desired position. Since thermoplastic materials are usually applied as very thin envelopes any displacement of the insert with respect to the cavity walls may result in improperly or incompletely coated areas on the insert. It has been found that if the material can be established initially entirely around the insert at the zone of the gate, thereafter pressure balance will result so that the unbalancing pressure on the insert is eliminated and the insert will remain in the proper position.

One of the principal objects of the present invention, therefore, is to provide a gate at the parting plane of the mold, which is arranged so as to effect an initial injection of the material in the mold cavity around the insert in substantially balanced condition, as a result of which the material flows at substantially equal velocity around the cross sectional circumference of the insert from both sides, so that the streams of material meet substantially at the parting line of the mold and at the opposite side thereof from the gate.

A correlative object is to maintain this pressure balance during the continued injection of the material through the gate so that the material flows axially of the insert in the balanced condition and a uniform thickness of material in enveloping relation to the insert results.

Other objects and advantages will become apparent from the following specification wherein reference is made to the drawing, in which.

Figure 1:
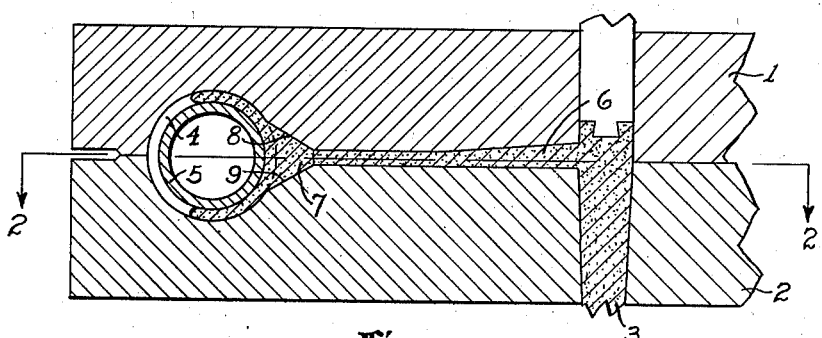
Fig. 1 is a fragmentary cross sectional view through a portion of a mold, showing the insert and the gate and the initial balanced flow of material around the insert.
Figure 2:
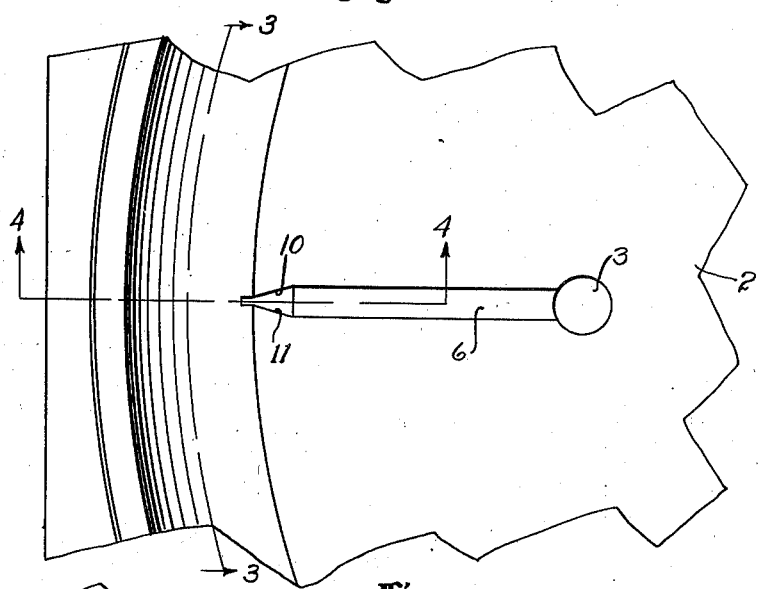
Fig. 2 is a plan view of the lower mold cavity with the insert and material removed and is taken on a plane indicated by the line 2—2 in Fig. 1.
Figure 4:
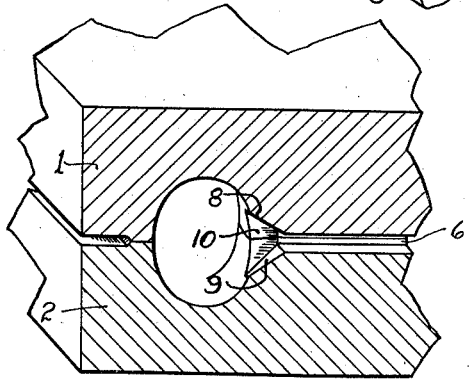
Fig. 4 is a fragmentary perspective sectional view showing the gate entering the cavity, the section being taken substantially along a plane indicated by the line 4—4 of Fig. 2.
Figure 3:
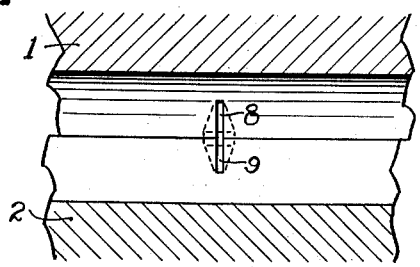
Fig. 3 is a fragmentary sectional view of the cooperating mold cavities and is taken on the surface indicated by the line 3—3 in Fig. 2.

For the purposes of illustration, the invention is shown in connection with the coating of automobile steering wheel rims, its use in connection with the coating of other inserts being readily apparent therefrom.

Referring to the drawing, the mold comprises an upper mold member 1 and a lower mold member 2, the lower mold member being provided with the usual sprue passage 3 through which the material is injected. The mold members 1 and 2, when in an assembled condition, define a cavity 4 of substantially circular cross section, conforming very accurately to the outer contour of the tubular insert 5 of the automobile steering wheel rim and being so related thereto that only a very thin enveloping film of thermoplastic material can enter between the insert and cavity walls.

In the illustration, however, the thermoplastic layer is shown in considerably exaggerated thickness for clearness in illustration. The insert and mold cavity are so positioned with respect to the parting plane of the mold members that substantially half of the cavity lies on each side of the plane.

Leading to the cavity 4 is a gate 6 which is defined partially by both of the mold members 1 and 2. A portion of the gate 6, beginning at the sprue 3 and extending almost to the mold cavity 4 may be relatively wide in the direction parallel to the parting plane. Closely adjacent the mold cavity 4, however, the gate 6 is increased in depth in both mold members 1 and 2 so that a gradually expanding discharge nozzle portion 7 is provided and leads into the clearance space in the mold cavity.

The nozzle portion 7 is relatively thin in cross section in a direction parallel to the parting plane and is relatively wide in the direction of a plane angularly disposed to the parting plane.

The top and bottom walls 8 and 9, respectively, of the portion 7 of the gate flare outwardly from the parting plane in the direction toward the insert and the side walls 10 and 11, respectively, converge toward the insert so that substantially the same amount of material can pass through the flaring discharge portion 7 as through the remainder of the gate, the only change being that the material is differently distributed on its entry into the mold cavity. It has been found that the positioning of the walls of the gate portion 7 in a plane angularly disposed to the parting plane of the mold will permit the material to initially flow in both directions circumferentially around the insert 5 in balanced relation as to pressure and velocity, so that the streams of material flowing around at opposite sides of the insert at the zone of the gate meet initially substantially at the parting plane of the mold opposite to the gate. Once the material has thus been established around the insert initially, it flows endwise of the insert as an enveloping sleeve due to the fact that the hydrostatic balance on the insert maintains the latter in balanced condition in the mold cavity.

If it is desired to mold an insert more thickly on one side than another, the divergence of the walls 8 and 9 may be so arranged that the resultant flare of the nozzle is proportioned to the amount of material required at the different portions and the distance of travel thereof around the insert at the zone of the gate.

Due to the passage provided, the material initially surrounding the insert at the zone of the gate recedes equally in each direction from the zone of the gate to complete the enveloping relation of the insert, and the material initially injected travels as the leading edges of the enveloping sleeve during the formation of the coating. Consequently, the initially injected material does not tend to block the gate or cavity at the zone of injection.

From the foregoing description, it will be seen that the present invention insures the proper filling of the mold cavity around an insert without distorting the insert relative to the cavity walls.

Although one form of the present invention has been shown and described, it will be apparent that other forms may be made without departing from the scope and spirit as defined in the appended claims.

Having thus described my invention, what I claim is:

1. A mold for molding thermoplastic material about an insert comprising a pair of separable mold sections having engageable faces defining a parting plane, surfaces in said sections defining a cavity, said cavity lying partially in each section, a sprue in one section, a gate extending along the parting plane of the mold sections and connecting the sprue with the cavity, a portion of the gate at its juncture with the cavity being of greater dimension in the direction of a plane angularly disposed to the parting plane than in the direction parallel to the parting plane.

2. A mold for molding thermoplastic material comprising separable mold sections defining a cavity when the mold sections are placed together, said cavity lying substantially one half in each section, a sprue in one section, a gate extending along the parting line of the mold sections and connecting the sprue and cavity, equal portions of the gate lying in the mold sections respectively, a portion of the gate adjacent the mold cavity being flared toward the cavity in a plane normal to the parting plane of the mold sections in balanced and symmetrical relation to the mold cavity.

3. An injection type mold for molding thermoplastic material around a reinforcing core comprising a pair of separable mold members, each member having an engaging face which defines a parting plane when the faces are together, surfaces in each of the engaging faces defining a cavity in which said reinforcing core may be supported in uniform spaced relation from the surfaces of the cavity, a spruce passage in one of the mold members, walls in the engaging faces of each of the mold members defining a gate which connects the sprue passage with the cavity, a discharge portion in the gate opening into the cavity on each side of the parting plane of the members, said discharge portion being greater in dimension in the direction of a plane disposed at an angle to the plane of the engaging surfaces than in the direction of a plane parallel to the engaging surface, the cross sectional area of the discharge portion lying on each side of the parting plane being substantially directly proportional to the amount of the cavity disposed on the corresponding side of the parting plane.

4. A mold for molding thermoplastic material about an insert, comprising a pair of separable mold sections having engaging faces providing a parting plane, surfaces in the mold sections defining a cavity, said cavity lying partially in each section, a gate adapted for introduction of material into the cavity and extending along the parting plane of the sections, a portion of said gate directly adjacent the cavity being progressively restricted in dimension toward the cavity of the mold sections in the parting plane thereof, and said portion of the gate being progressively expanded in dimension toward the cavity in the direction of a plane angularly disposed to the parting plane of the mold sections.

5. A mold for molding thermoplastic material about an insert, comprising a pair of separable mold sections having engaging faces providing a parting plane, surfaces in the sections defining a cavity, said cavity lying partially in each section, a sprue in one section, a gate extending along the parting line of the sections and connecting the sprue with the cavity, a discharge portion of said gate adjacent the cavity being progressively expanded toward the cavity in a direction normal to the parting plane of the sections and progressively restricted toward the cavity along said parting plane.

JAMES S. REID.